(12) United States Patent
Hung

(10) Patent No.: US 8,976,346 B2
(45) Date of Patent: Mar. 10, 2015

(54) OPTICAL COUPLING LENS AND SYSTEM FOR MEASURING OPTICAL ATTENUATION COEFFICIENT

(71) Applicant: Hon Hai Precision Industry Co., Ltd., New Taipei (JP)

(72) Inventor: Yi Hung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/755,081

(22) Filed: Jan. 31, 2013

(65) Prior Publication Data

US 2014/0139836 A1 May 22, 2014

(30) Foreign Application Priority Data

Nov. 22, 2012 (TW) .............................. 101143657 A

(51) Int. Cl.
*G01J 1/42* (2006.01)
*G02B 6/32* (2006.01)
*G01M 11/02* (2006.01)

(52) U.S. Cl.
CPC ............ *G02B 6/32* (2013.01); *G01M 11/0285* (2013.01)
USPC ....................................................... 356/218

(58) Field of Classification Search
CPC ............. G01J 1/42; G01J 1/4228; G01J 1/02; G01J 1/0271; G01J 1/0411; G01J 1/4257; G01J 2001/4247; G01J 2001/4252; G01J 3/0205; G01J 3/42; G01J 11/00; G01J 1/0228; G01J 1/0242; G01J 1/04

See application file for complete search history.

(56) References Cited

U.S. PATENT DOCUMENTS

| | | | | |
|---|---|---|---|---|
| 4,260,883 | A | * | 4/1981 | Onoda et al. ................... 250/226 |
| 5,190,042 | A | * | 3/1993 | Hock .............................. 600/405 |
| 5,781,305 | A | * | 7/1998 | Downes ......................... 356/435 |
| 2002/0150340 | A1 | * | 10/2002 | Ikeda et al. ...................... 385/39 |
| 2004/0165828 | A1 | * | 8/2004 | Capewell et al. ................ 385/47 |
| 2006/0209379 | A1 | * | 9/2006 | Guscho .......................... 359/245 |
| 2012/0069336 | A1 | * | 3/2012 | Rakitzis ......................... 356/369 |
| 2013/0330230 | A1 | * | 12/2013 | Uri et al. .......................... 422/69 |

FOREIGN PATENT DOCUMENTS

JP 61-232412 * 10/1986

* cited by examiner

*Primary Examiner* — Michael P Stafira
(74) *Attorney, Agent, or Firm* — Novak Druce Connolly Bove + Quigg LLP

(57) ABSTRACT

An optical coupling lens includes a refraction surface, a first total reflection surface, a second total reflection surface, a first aligning member and a second aligning member. The refraction surface, the first total reflection surface and the second total reflection surface are orderly connected end to end. The first aligning member and the second aligning member are formed on the refraction surface.

4 Claims, 1 Drawing Sheet

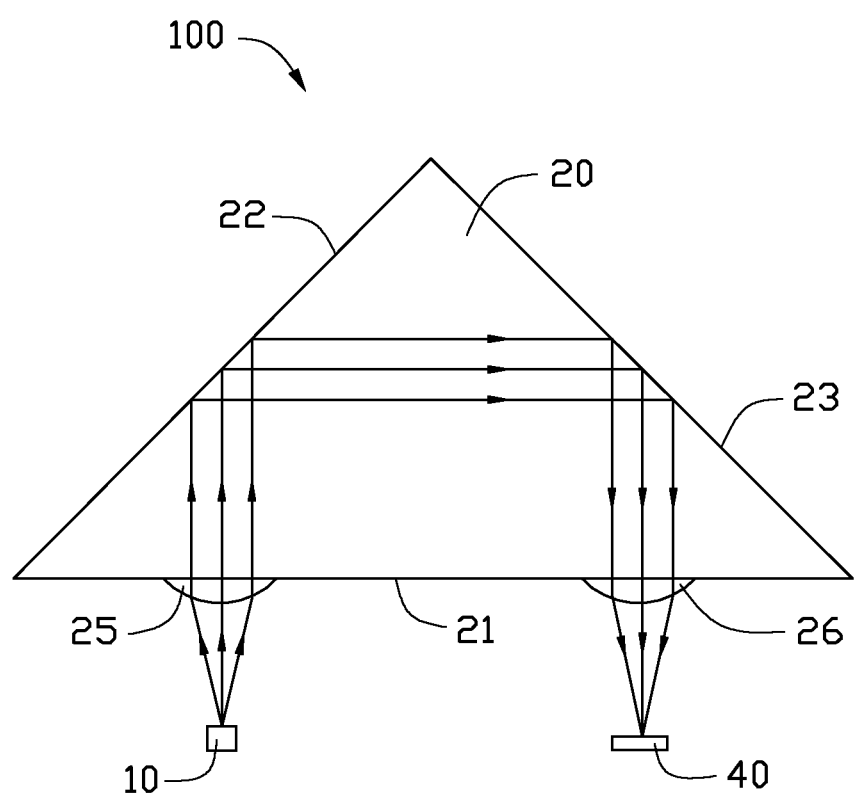

OPTICAL COUPLING LENS AND SYSTEM FOR MEASURING OPTICAL ATTENUATION COEFFICIENT

BACKGROUND

1. Technical Field

The present disclosure relates to an optical coupling lens and a system for measuring optical attenuation coefficient.

2. Description of Related Art

An optical communication system usually includes an optical emitter, a first coupling lens aligned with the optical emitter, an optical fiber, a second coupling lens, and an optical receiver aligned with the second coupling lens. When in use, the optical emitter sends out an optical signal. The optical signal is transmitted by the first coupling lens, the optical fiber, and the second coupling lens sequentially, and is received by the optical receiver.

Before using, whether an optical attenuation coefficient of the first coupling lens and the second coupling lens is in a predetermined range needs to be determined. Yet, the optical signal may be lost in the first coupling lens and the second coupling lens, and also in the optical fiber. Thus, it is difficult to measure the optical attenuation coefficient of the first coupling lens and the second coupling lens.

Therefore, it is desired to provide an optical coupling lens and a system for measuring an optical attenuation coefficient which can overcome the above mentioned problems.

BRIEF DESCRIPTION OF THE DRAWINGS

The FIGURE is a schematic view of a system for measuring optical attenuation coefficient according to an exemplary embodiment.

DETAILED DESCRIPTION

The FIGURE shows a system 100 for measuring optical attenuation coefficient. The system 100 includes an optical emitter 10, an optical coupling lens 20 and an optical detector 40.

The optical emitter 10 is configured for converting an electrical signal into an optical signal and sending the optical signal to the optical coupling lens 20. In this embodiment, the optical emitter 10 is a vertical cavity surface emitting laser.

The optical coupling lens 20 is configured for coupling the optical signal emitted by the optical emitter 10 to the optical detector 40. The optical coupling lens 20 includes a refraction surface 21, a first total reflection surface 22, and a second total reflection surface 23. The refraction surface 21, the first total reflection surface 22 and the second total reflection surface 23 are orderly connected end to end. An included angle between the first total reflection surface 22 and the refraction surface 21 is about 45 degrees. An included angle between the second total reflection surface 23 and the refraction surface 21 is about 45 degrees. An included angle between the first total reflection surface 22 and the second total reflection surface 23 is about 90 degrees. A first aligning member 25 and a second aligning member 26 are formed on the refraction surface 21. The first aligning member 25 is spaced from the second aligning member 26. The first aligning member 25 is aligned with the optical emitter 10, and is configured for converting the optical signal emitted by the optical emitter 10 to a parallel light beam. The second aligning member 26 is aligned with the optical detector 40, and is configured for converging the parallel light beam to the optical detector 40.

In this embodiment, the first aligning member 25 and the second aligning member 26 are convex lenses. The first aligning member 25 and the second aligning member 26 are integrally formed with the refraction surface 21. In other embodiments, the first aligning member 25 and the second aligning member 26 can also be Fresnel lenses.

The optical detector 40 is used to measure an intensity of the optical signal. In this embodiment, the optical detector 40 is a photodiode.

When in use, firstly, the optical detector 40 is directly aligned with the optical emitter 10 and obtains an intensity P of the optical signal emitted by the optical emitter 10. Then the optical emitter 10 is aligned with the first aligning member 25, and the optical detector 40 is aligned with the second aligning member 26. The optical emitter 10 sends the optical signal with the intensity P to the optical coupling lens 20. The first aligning member 25 converts the optical signal into the parallel light beam and directs the parallel light beam to the first total reflection surface 22. The first total reflection surface 22 reflects the parallel light beam to the second total reflection surface 23. The second total reflection surface 23 reflects the parallel light beam to the second aligning member 26. The second aligning member 26 converges the parallel light beam to the optical detector 40. The optical detector 40 receives and measures the light beam and obtains an intensity I of the light beam. An optical attenuation coefficient L of the optical coupling lens 20 is calculated according to a formula $$L = 10 \times \log \frac{I}{P}.$$

The optical coupling lens 20 directly transmits the optical signal emitted by the optical emitter 10 to the optical detector 40, thus, a transmission loss in an optical fiber is avoided and the optical attenuation coefficient L of the optical coupling lens 20 can be accurately measured.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A system for measuring an optical attenuation coefficient, the system comprising:
    an optical emitter;
    an optical detector; and
    an optical coupling lens comprising:
        a refraction surface;
        a first total reflection surface;
        a second total reflection surface;
        a first aligning member; and
        a second aligning member; wherein
    the refraction surface, the first total reflection surface and the second total reflection surface are orderly connected end to end, a sectional surface of the optical coupling lens intersecting with the refraction surface, the first total reflection surface and the second total reflection surface is triangular shaped, the first aligning member and the second aligning member are formed on the refraction surface; and wherein the optical emitter is configured for emitting an optical signal, the first aligning member is configured for converting the optical signal into a parallel light beam and directing the parallel light beam to the first total reflection surface, the first total reflection surface is configured for reflecting the parallel light beam to the second total reflection surface, the second total reflection surface is configured for reflecting the parallel light beam to the second aligning member, the second aligning member is configured for converging the parallel light beam to the optical detector.

2. The system of claim 1, wherein an included angle between the first total reflection surface and the refraction surface is about 45 degrees, an included angle between the second total reflection surface and the refraction surface is about 45 degrees, and an included angle between the first total reflection surface and the second total reflection surface is about 90 degrees.

3. The system of claim 1, wherein the first aligning member and the second aligning member are convex lenses.

4. The system of claim 1, wherein the first aligning member and the second aligning member are Fresnel lenses.

* * * * *